No. 720,667. PATENTED FEB. 17, 1903.
W. CARTWRIGHT.
EXPANSION STANDARD TREE SUPPORT.
APPLICATION FILED OCT. 18, 1901.
NO MODEL.
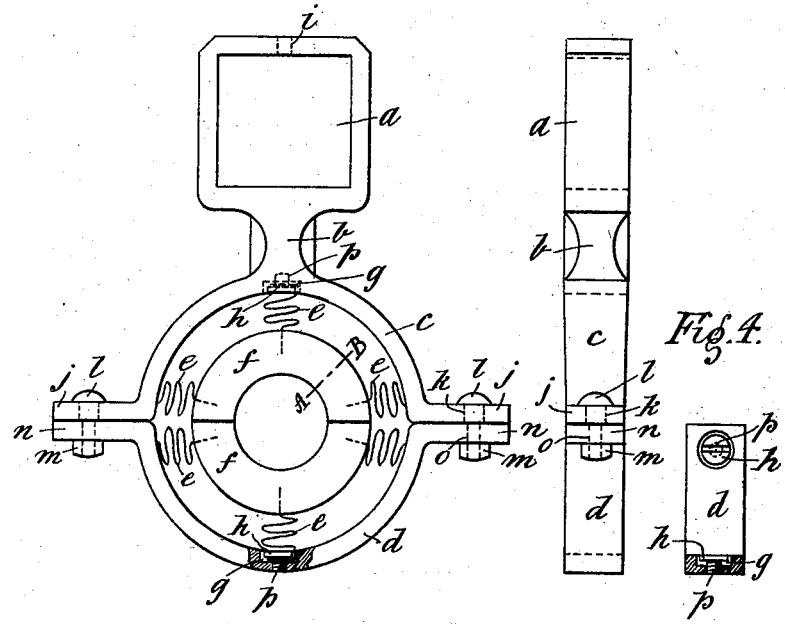
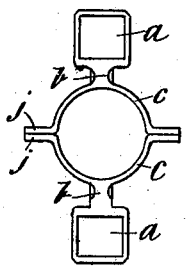
Witnesses.
E. H. Bayly.
J. Brown.
Inventor.
William Cartwright,
per John Pitt Bayly,
Attorney

UNITED STATES PATENT OFFICE.

WILLIAM CARTWRIGHT, OF CLEETHORPES, ENGLAND.

EXPANSION-STANDARD TREE-SUPPORT.

SPECIFICATION forming part of Letters Patent No. 720,667, dated February 17, 1903.

Application filed October 18, 1901. Serial No. 79,180. (No model.)

*To all whom it may concern:*

Be it known that I, WILLIAM CARTWRIGHT, market-gardener, a subject of the King of Great Britain, residing at 48 Mill road, Cleethorpes, in the county of Lincoln, England, have invented a new and useful Expansion-Standard Tree-Support, of which the following is a specification.

My invention relates to an expansion-standard tree-support, which consists of an iron clip in two parts bolted together, with two india-rubber clips for inclosing the tree, the said india-rubber clips being attached to the iron frames by springs. On one or both of the iron clips or frame I weld a short stem with square eye. This said eye receives the end of a stake, which is driven into the ground.

The object of my invention is to form an apparatus with an expanding center to allow trees to develop without chafing the stems, which is not done by the present mode of fastening to stakes. I attain these objects by the mechanism illustrated in the accompanying drawings, in which—

Figure 1 is a plan of the tree-clip with one square eye. Fig. 2 is a side view of Fig. 1. Fig. 3 is a plan of the apparatus with two square eyes. Fig. 4 is a section of the clip $d$, showing the recess $g$, in which the end of the spring $e$ is fixed under the screw-head $h$. Fig. 5 is a section of the india-rubber clip on line A B.

In carrying my invention into practice I construct of wrought-iron (or malleable) a semicircular clip $c$, and on this said clip $c$ I weld a stem $b$, with a square eye $a$ at its end. The eye $a$ is provided with a nail-hole $i$ for fixing the end of the stake when passed into the square eye $a$ from the ground. Each end $j$ of the semicircular iron clip $c$ is turned outward in a horizontal direction and is provided with a square hole $k$. To the above-described semicircular clip $c$ I fix by bolts $l$ and nuts $m$ another corresponding plain semicircular clip $d$ with ends $n$. These said ends are provided with round holes $o$. In the interior of the iron clips which form the frame I attach two semicircular india-rubber clips $ff$ by means of springs. Each spring is attached at one end to the india-rubber, as shown by dotted lines, Fig. 1, with the other end fixed to the iron clip or clips by the screw $p$ beneath the head $h$ in the recess $g$.

If preferable, I may adopt an apparatus as in Fig. 3, having two semicircular wrought-iron clips $c$, with stems $b$ and square eyes $a$ to receive the ends of two stakes.

What I claim as my invention, and desire to secure by Letters Patent, is—

1. In a tree-support, the combination of two semicircular metallic clips, having outturned ends, each provided with a square eye to receive a stake; bolts and nuts for connecting said outturned ends; two semicircular rubber clips, and springs connected to both sets of clips, and supporting the rubber clips within the metallic ones, substantially as described.

2. In a tree-support the combination of two semicircular metallic clips, having outturned ends, bolts and nuts for connecting said outturned ends; two semicircular rubber clips, and springs connected to both sets of clips, and supporting the rubber clips within the metallic ones, and means for attaching the device to a stake, substantially as described.

In testimony whereof I have signed my name to this specification in the presence of two subscribing witnesses.

WILLIAM CARTWRIGHT.

Witnesses:
 F. FAWCETT,
 TOM WARD.